United States Patent [19]
Hed

[11] Patent Number: 5,247,390
[45] Date of Patent: Sep. 21, 1993

[54] LIGHTWEIGHT LOW-LOSS REFRACTIVE LIGHT DIFFUSION SYSTEM

[75] Inventor: Aharon Z. Hed, 12 Wagon Trail, Nashua, N.H. 03062

[73] Assignee: Aharon Zeev Hed, Nashua, N.H.

[21] Appl. No.: 788,184

[22] Filed: Nov. 5, 1991

[51] Int. Cl.$^5$ .......................... G02B 5/02; G02B 13/20
[52] U.S. Cl. .................................. 359/599; 359/707; 359/893
[58] Field of Search ................ 359/591–599, 359/451–461, 618–624, 707, 738, 741–743, 893, 894

[56] References Cited

U.S. PATENT DOCUMENTS

| | | | |
|---|---|---|---|
| 2,143,303 | 1/1939 | Danimont | 359/454 |
| 3,393,034 | 7/1968 | Imai | 359/593 |
| 3,671,101 | 6/1972 | Finch | 359/599 |
| 4,270,842 | 6/1981 | Muchel et al. | 359/742 |
| 4,293,196 | 10/1981 | Hilbert | 359/743 |
| 4,310,219 | 1/1982 | Jaccard | 359/599 |
| 4,329,023 | 5/1982 | Harrison et al. | 359/707 |
| 4,391,495 | 7/1983 | Mazurkewitz | 359/742 |
| 4,671,625 | 6/1987 | Noble | 359/726 |
| 4,923,280 | 5/1990 | Clausen et al. | 359/456 |
| 4,936,657 | 6/1990 | Tejima et al. | 359/40 |
| 5,066,099 | 11/1991 | Yoshida et al. | 359/599 |

Primary Examiner—Bruce Y. Arnold
Assistant Examiner—Thong Nguyen
Attorney, Agent, or Firm—Herbert Dubno

[57] ABSTRACT

A light system comprising a light source adapted to illuminate an area and at least two refracting substantially transparent and coextensive films juxtaposed with one another and interposed between the source and the area, the films having mutually confronting patterns of refracting rises formed on respective surfaces of the films, the rises being separated by intervening recesses and the rises and recesses being so oriented as to form diversely distributed light-refraction paths across the films, the patterns being selected so that gaps are provided between the films and to effect diffusion of light from the source cast upon the area.

22 Claims, 11 Drawing Sheets

LIGHTWEIGHT LOW-LOSS REFRACTIVE LIGHT DIFFUSION SYSTEM

FIELD OF THE INVENTION

The present application relates to a light-diffusion system and, more particularly, to a system in which a diffuser is positioned between a source of light and an illuminated area to spread the light received in the latter.

BACKGROUND OF THE INVENTION

Light diffusers are extensively used to redistribute light from point or linear light sources so as to convert these concentrated light sources to more pleasing large area light sources.

In the prior art, two main approaches to accomplish this goal are practiced.

In a first approach, the light-diffusing element contains randomly distributed imperfections that refract and disperse the incoming light in all directions. Belonging to this approach are frosted elements, and white glasses and plastics. In the design of such diffusers, light-emission differences from various points of the surface decrease as the total light loss increases.

More particularly, in order to achieve high quality (homogeneous light distribution) from the emitting surface, the thickness of the diffusing elements and the concentration of dispersing particles is increased, this causes light loss within the element itself, mostly due to the increased integrated optical path of the light traversing the dispersing element and losses incurred in multiple reflections (including back reflections) from the frosted surfaces or the particles within the diffuser. Such diffusers are thus optically inefficient and their weight can become unacceptable in some applications Representing the second approach is a refractive type light diffuser, like those often used in conjunction with fluorescent light sources, in which most of the light rays, while refracted in various directions, traverse the optical medium only once, and, as a result, only minimal optical losses occur. These diffusers usually consist of solid glass or plastic (having an index of refraction appreciably larger than 1) on which a tessellation of a geometrical three-dimensional impression is produced. The impressions are often small pyramids, other geometrical forms having faceted surfaces or lens-like protrusions, characterized by the fact that a plurality of angles of refraction are presented to light emanating from the light source.

Light wavefronts are thus refracted in various directions by the panel, resulting in diffusion of the light from a sharp source into a less concentrated form emanating from a larger area. The shortcoming of this approach is that often a strong residual image of the point (or line in the case of fluorescent lights) light source is still visible and the areal weight of the lens is appreciable. Furthermore, such diffusing panels always have an embossed outer surface where dust can accumulate causing optical absorption losses and rendering cleaning of these surfaces cumbersome.

In the prior art, Fresnel lenses are sometimes used as flat optical elements in optical systems to form real and virtual images. In these systems, the Fresnel lenses have very well-defined circular geometry and the ridges of the lenses have an exact relationship to each other (namely, they are the micro-projection on a plane of an actual convex on concave lens) so as to concentrate light, by contrast to diffusion.

OBJECTS OF THE INVENTION

It is an object of the present invention to provide low-weight high-efficiency light diffusing screens.

It is another object of the instant invention to provide such diffusers for generally linear light sources.

It is yet another object of the present invention to provide diffusing panels having completely smoothed outer surfaces thus preventing dust accumulation and their associated optical losses.

A more general object is to provide an improved large-area lighting system avoiding drawbacks of the prior art.

SUMMARY OF THE INVENTION

In the present invention, the shortcomings of prior art diffuser screens are avoided by using a plurality, or at least two thin highly transmissive screens, on which refracting patterns have been embossed so as to refract lights from points or line sources so as to diffuse the light into a broader angle of emanation from the light source. As a result, a lighter system is enabled and better light distribution is feasible at an over-all reduced cost.

In another embodiment, at least one screen is embossed with a tessellation of Fresnel-like flat patterns of ridges to obtain an even more compact and light-weight diffuser. As will be explained below, these patterns are not truly Fresnel lenses, in that the refracting patterns used cannot define a lens of any focal length, nor are these refractive patterns capable of imaging an object on any single plane.

More specifically, the invention is a light system which comprises:

a light source adapted to illuminate an area; and at least two refracting substantially transparent and coextensive films juxtaposed with one another and interposed between the source and the area, the films having mutually confronting patterns of refracting rises formed on respective surfaces of the films, the rises being separated by intervening recesses and the rises and recesses being so oriented as to form diversely distributed light-refraction paths across the films, the patterns being selected so that gaps ar provided between the films and to effect diffusion of light from the source cast upon the area.

The objects of the present invention are thus achieved by interposing between the light source and the light user a plurality of refracting surfaces that refract the incoming light into varying orientations relative to the light sources. Furthermore, these refracting surfaces are created on at least two independent relatively thin films facing each and having vacuum, air or another gas in the gap between the refracting surfaces.

The refracting surfaces are embossed on the faces opposing each other in the composite diffuser while the external surfaces of the films are smooth. As a result, weight reduction and increases in the refracting surfaces are achieved relative to traditional refracting diffuser screens.

In essence, the invention is an optical "form" where the morphology of the internal cavities of the structure, as well as the cavity walls, are variable from point to point in such a way as to present to the light beam to be diffused, a broad range of directional refraction diversity without incurring excessive optical losses. Furthermore, by having only smooth surfaces exposed to the external environment, dust collection on the surfaces is minimized and intermittent cleaning of the surfaces is facilitated.

Two major families of embossed films form the basis of the diffusers of the instant invention, namely, films on which the embossment is a tessellation of polyhedra with planar or curved faces and a tessellation of essentially planar polygons having groups of concentric striations parallel to the polygon sides. The cross sections of these striations can be triangular or curved, depending on the specific application.

In some preferred embodiments, the two films are separated from each other by periodic protrusions on at least one of the inner embossed surfaces. In other embodiments, at least one of the film inner surfaces (the surfaces facing the respective opposing film) is simply frosted. In yet other preferred embodiments, the two opposing films have the same embossment on their inner surfaces, while in other embodiments, at least two of the embossed patterns of the films differ, while the periodicity of the patterns is preferably the same, although the periodicities can differ as well.

One way of viewing the diffusers of the instant invention is as a plurality of thin plastic sheets having embossments on at least one of their surfaces while having the two external surfaces of the laminate created completely smooth.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
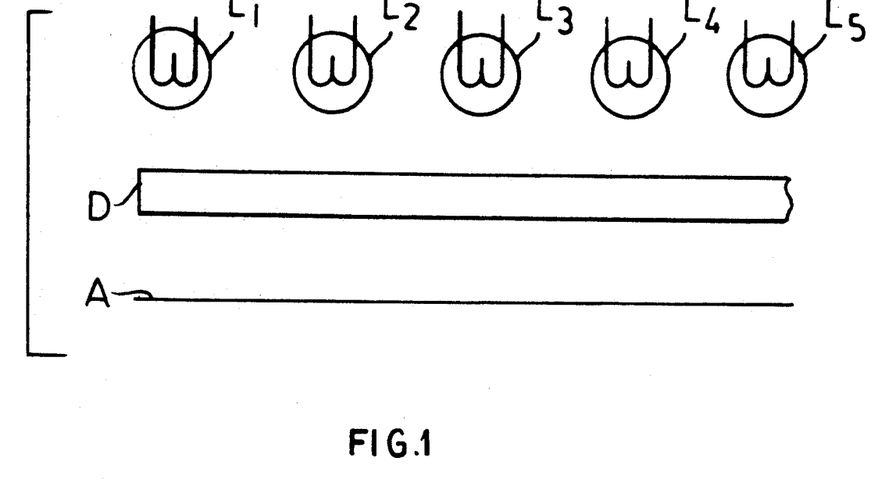
FIG. 1 is an elevational view of a system according to the invention.
Figure 1A:
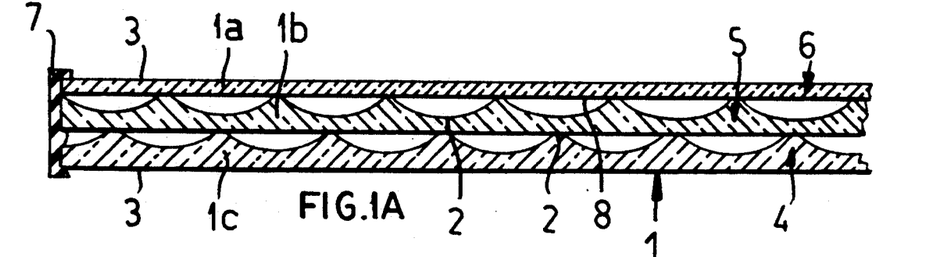
FIGS. 1A to 1E are generalized cross sections through light diffusers of the instant invention.

FIG. 1 is a diagrammatic elevation showing a plurality of light sources, $L_1$, $L_2$, $L_3$, $L_4$, $L_5$, ... which can be point sources or line sources, a light diffuser D (FIGS. 1A-1E to FIGS. 8A-8D and FIGS. 11-14) and an area A illuminated through the diffuser D.

The essence of the invention is to provide refracting surfaces to the emerging light from the light source that will modify the optical path of the light so as to distribute the light over a larger area while maintaining in the structure a low weight, low optical losses and smooth external surfaces that prevent dust accumulation and facilitate cleaning.

FIG. 1A to 1E show some examples of cross sections through diffusion screens of the instant invention. In general, the screen is a laminate 1, 10, 20, 30, 30A of a plurality of plastic sheets (in FIG. 1A, three such translucent sheets 1a, 1b, 1c, while in FIGS. 1B to 1E, the embodiments involve only two sheets) on which a tessellation of depressions 2 (or, in general, impressions) is embossed. The two outer surfaces 3 of the laminate are kept in their virgin state and as smooth a possible.

The plastic films can be made of any transparent polymer or glass. Examples of such polymers are various acrylic resins and polycarbonates that are characterized by having very low optical losses and a relatively high index of refraction. When highly flexible screens are desired, one can chose to use materials with somewhat higher optical losses like polystyrene or polyester films that are more flexible than polycarbonate films. While as mentioned, various glass films could be used in lieu of the proposed plastic films, there are only limited applications where glass would be advantageous. This would be in hot or chemically active environments, for instance within laboratory hoods or in plants where the astrosphere is laden with corrosive gases or solvents. It is desirable that the index of refraction of the film material would be relatively large, and at least 1.3, but preferably in the range of 1.4 to 1.6. The thickness of the film is determined by its physical properties, particularly its ability to withstand its own weight at the thinner parts of the film. For polycarbonates, thicknesses in the range of 10 to 40 mils (minimum and maximum thickness after embossment, excluding spacing protrusions) are quite satisfactory.

For analogy purposes, the laminate of the instant invention has been termed an "optical foam" but it should be understood that for most practical applications, the space between the various embossed sheets is interconnected, while in most foams, the voids are usually not interconnected. As a result, one can, if desired, evacuate the space between the laminates and thus improve interfilm adhesion as well as remove residual water vapors and other possible contaminants from the space enclosed by the embossed plastic films.

To maintain the vacuum, and to facilitate post production handling of the screens, as well as provide for attachment of the screens to fixtures, an external sealing band (7 in FIG. 1A) surrounds the laminate and seals the space within. Evacuation is conducted through a single perforation (not shown) on the sealing band and the perforation is closed after evacuation of the space between the laminates. The sealing band can be manufactured from an appropriate elastomer.

In FIGS. 1A to 1E, the light sources (not shown) that need be diffused are positioned at the bottom of the screen and at a distance that is usually at least one order of magnitude larger than the screen's total thickness.

Figure 2:
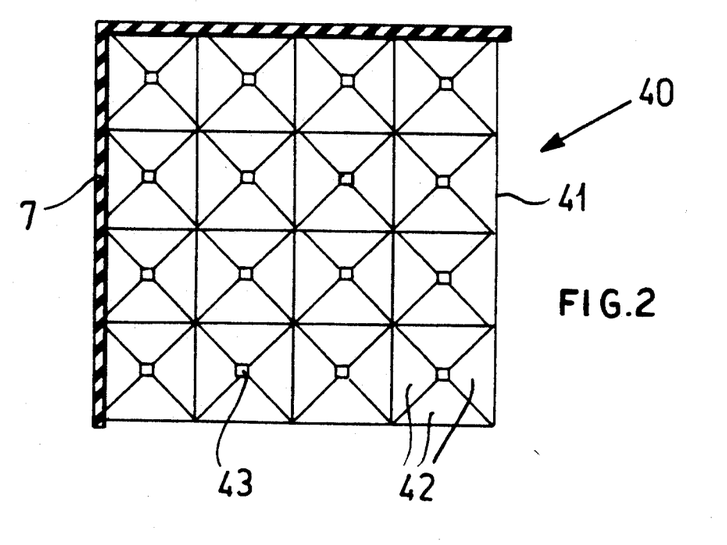
FIG. 2 is a top view of one embodiment of the embossed films used in the instant invention.

FIG. 2 shows a top projection of an example of the embossed films of the instant invention, and particularly a corner thereof. The film 40 has a tessellation of rectangular pyramids 41. The four faces 42 of the pyramid, can be either flat planes, concave or convex surfaces. In this example, we truncate the apex 43 of the pyramidal protrusion to facilitate the formation of the laminate and the bonding of the films when this is desired. FIG. 2 also shows the location of the sealing band 7 mentioned above.

Figure 3:
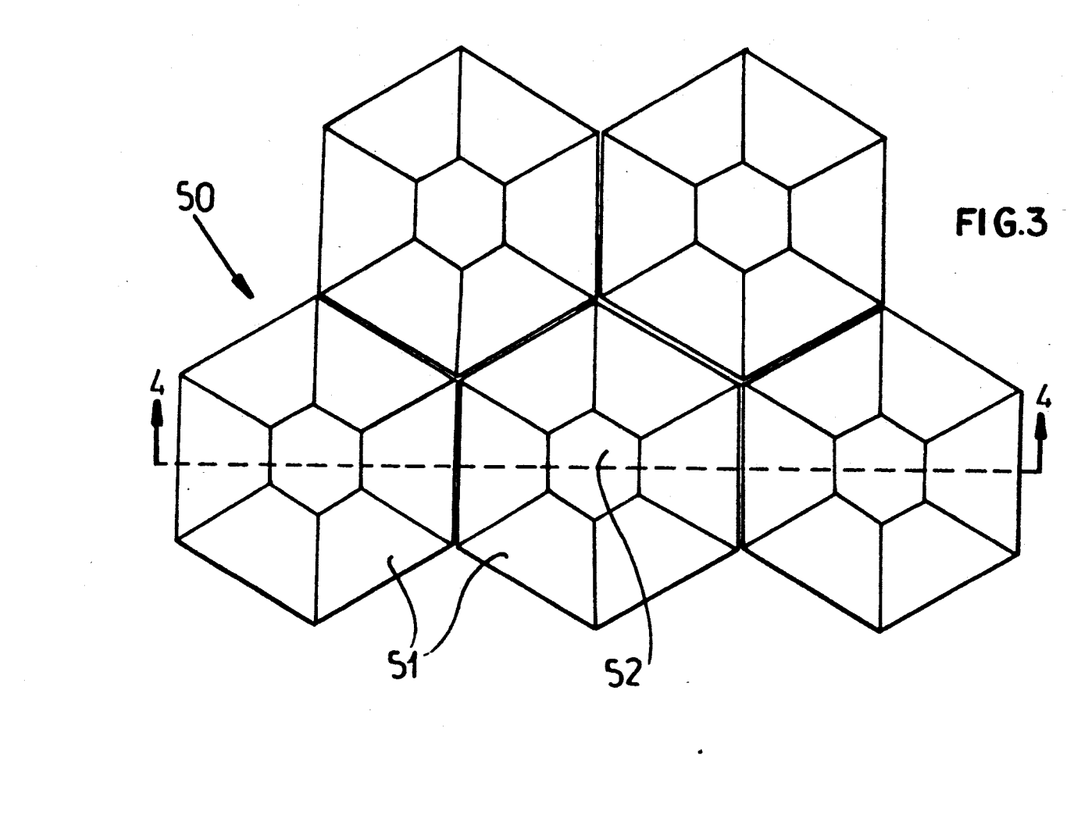
FIG. 3 is a top view of a segment of another embossed faceted film used in the instant invention.

Another example of the embossed films of the instant invention is given in FIG. 3, which shows a segment of the tessellation on the film 50, in this case, a hexagonal tessellation of faceted hexagons. Here, as in the case of the rectangular pyramids described in FIG. 2, the facets 51 of the hexagon can be either planar surfaces, or concave surfaces or convex surfaces.

FIGS. 4A–4E show cross sections through the plane A of the film illustrated in FIG. 3 to demonstrate the variety of possible embodiments of the film.

Figure 4A:
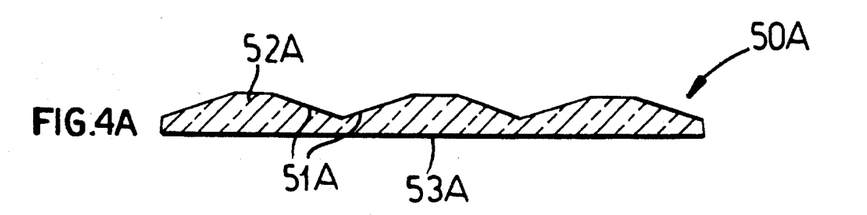
FIGS. 4A to 4E are cross sections through examples of faceted films used in the instant invention.

In FIG. 4A, the apex 52A of the hexagonally faceted embossment is simply a flat hexagon parallel to the flat smooth base 53A of the film 50A. It is often desired to separate the films from each other by some minimal distance, then the apex of the hexagonal embossment is in the form of a protrusion 52B, 52C, 52D, 52E, with appropriate height. The specific form of the protrusion is not particularly critical, and FIGS. 4B to 4E show some examples. It is not necessary to have the interfilm separating protrusions on the apex of each of the faceted embossments, as shown for instance in FIGS. 1D and 1E, where the separating protrusions occur only on every third apex or at a periodicity three times the periodicity of the main embossment.

The function of the protrusions is only to provide the separation between the films of the laminate, and with some materials (like polycarbonates), the film's rigidity is sufficient to prevent film sagging between protrusions with larger interprotrusion separation than, for instance, with polystyrene films of the same thickness. In some embodiments of the instant invention, particularly when it is desired to have a highly flexible diffuser (discussed in greater detail below), the interfilm distance is kept by the presence of lightly pressurized gas between the various films of the laminate rather than by physical protrusions on selected apexes of the embossment.

In a second group of diffuser screens with which the instant invention can be implemented, a tessellation of essentially flat polygons is formed with striations concentric with the polygons sides. This film structure will be better understood in conjunction with FIGS. 5 and 6A to 6E, which are examples of the second family of films used in the instant invention.

Figure 5:
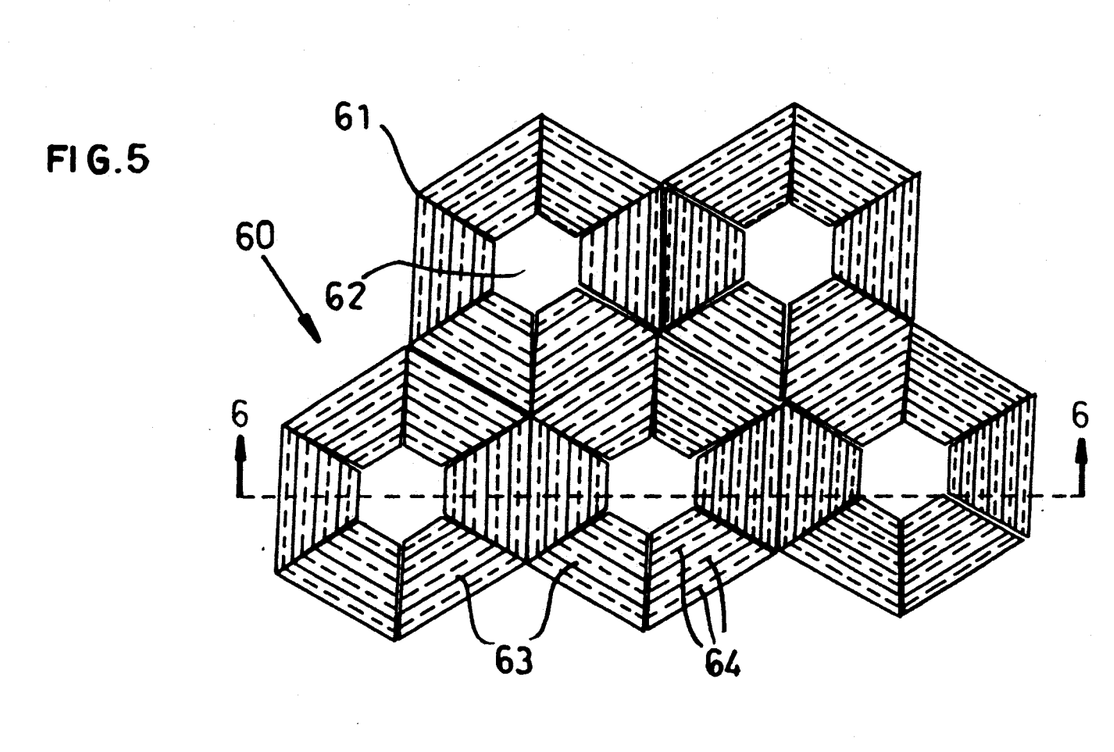
FIG. 5 is a top view of a segment of striated film used in the instant invention.

FIG. 5 shows a top projection of a striated film 60, consisting of a tessellation of circumferential hexagons 61 surrounding central hexagons 62. In the space between these two hexagons are formed six equilateral trapezoids 63. The trapezoids 63 are striated with depressions 64 (or protrusions) that are parallel to the hexagon sides 61, thus forming in essence a group of concentric hexagonal striations. The goal of the striations is to present point to point variability in the optical path traversed by the impinging light, as well as, present varying striation orientations to this light.

Figure 6A:
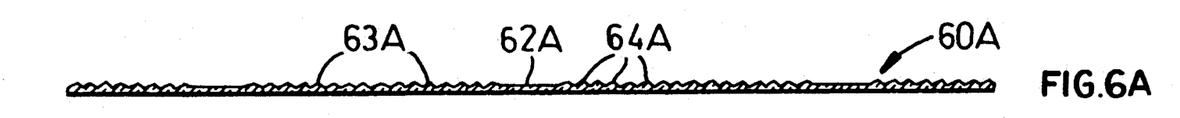
FIGS. 6A to 6E are cross sections through examples of striated films used in the instant invention.

The cross section of these striations can take a large number of differing shapes as exemplified in FIGS. 6A to 6E which are typical cross sections along the line A—A of FIG. 5 of few embodiments of the striated film 60. FIG. 6A shows a film 60A having flat central hexagons 62A surrounded by the trapezoids 63A in which striations 64A are created by a series of parallel triangular deformations of the surface.

In most applications, when it is desired to limit light losses, it is desired that the apex angle of the triangular protrusions be larger than 90°, namely, the base angles of the triangles should be smaller than 45°. This limits the extent of complete internal reflection of light at the triangular surface. There are some circumstances when it would be desired to increase the percentage of light that undergoes multiple reflections before emanating from the diffuser, for instance, when obtaining more homogeneous light distribution is more important than limiting the losses due to absorption.

In these cases, the apex angle can be at 90° or somewhat smaller. When using such sharper angles in the striations, the back reflector (at the light source) should be made to be as reflective as possible to limit losses from back-refracted light absorption in the reflectors.

Figure 6B:
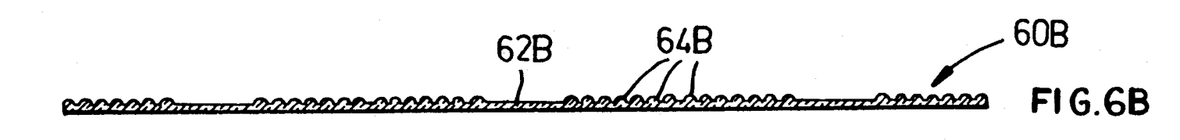
Figure 6C:
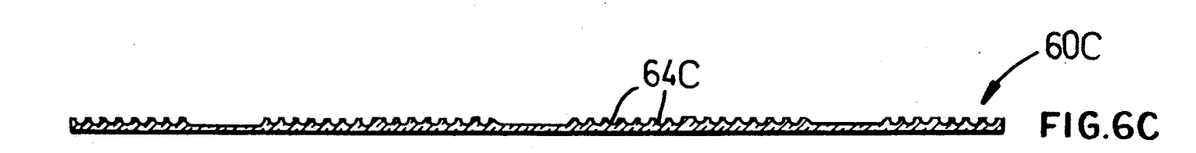

FIG. 6B shows an embodiment of the striated film of the instant invention where the striations are parallel convex protrusions 64B, arranged in a manner similar to that described in FIG. 6A, except a somewhat larger set of central hexagons 62B is used. Such striated film are best used as the second refracting film between the light to be diffused and the light users. FIG. 6C shows yet another embodiment of the striations' geometry in films as generally described in FIG. 5, where the striations are formed by parallel concave protrusions 64C on the surface of the film arranged as described above. This type of film is best used as the first refractive film between the light to be diffused and the light user.

Figure 6D:
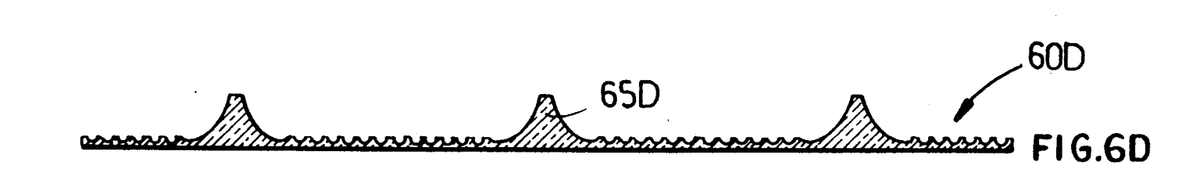
Figure 6E:
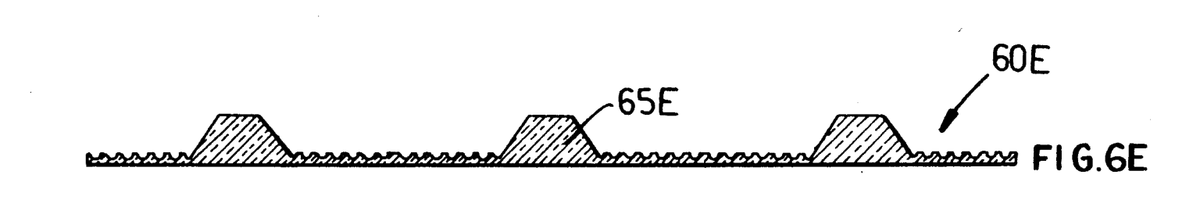
Figure 7A:
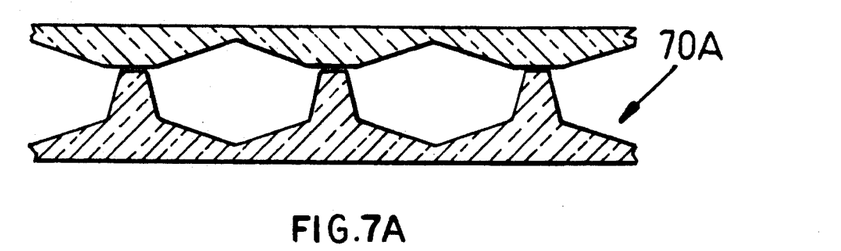
FIGS. 7A to 7D and FIGS. 8A to 8D are cross sections through some of the diffusers of the instant invention.
Figure 7B:
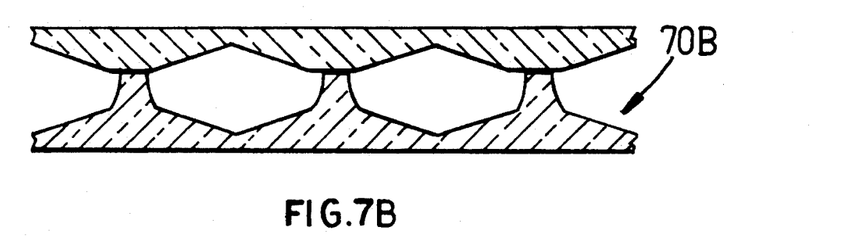
Figure 7C:
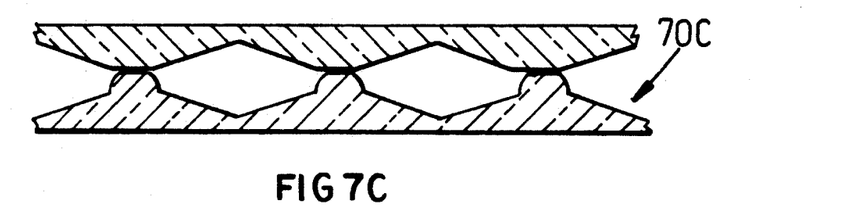
Figure 7D:
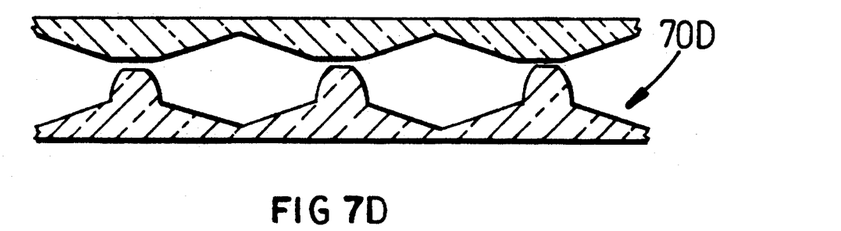

FIGS. 6D and 6E show for completeness two examples of interfilm separating protrusions positioned on the small central hexagons of a film as shown in FIG. 6C. As mentioned above, it is not necessary that such protrusions be present in all central hexagons in the tessellation, but can be spaced apart as discussed in conjunction with FIGS. 1D and 1E.

Tessellations of other concentric striated polygons or even of concentric striated circles can also be useful in the instant invention. When such a tessellation does not cover the total film area, the free area between the polygons or the circles can be striated itself, can be left smooth if this area occupies less than about 75% of the total area, or can be partially used for interfilm separating protrusions.

The diffusers of the instant invention work in a manner similar to traditional refractive diffusers, namely light reaching the first sheet is diffused into a larger area by having the impinging beam fractionated and refracted in various directions by the various facets embossed on the screen. The use of nonplanar surfaces as the facets of the embossed structure provide for variations from point to point on a given facet of the angle of incidence of the light, and thus further modification of the direction of the emerging beam. These are well known elements of the prior art in diffusers where the light passes through a single set of periodic geometrical irregularities on the surface of the diffuser. Here the light emerging from the first embossed surface can be further diffused by a second embossed surface and thus the image of the light source behind the diffuser is further blurred. This effect is usually enhanced by increasing the distance between the films of the laminate, and thus the reason for providing protrusions that space the films apart. Effective embodiments of the instant invention can be obtained by using a variety of combinations of films having either similar or dissimilar embossments in any given diffuser.

Returning to FIG. 1A, where we have shown a diffusion screen 1 consisting of three films, generally referred to at 1a, 1b, 1c and structurally distinguished as 4, 5 and 6, respectively. Films 4 and 5 are embossed with identical concave tessellations as shown in FIG. 2 or FIG. 3, and are displaced relative to each other by half the tessellation period. The film 6 can be smooth on both its sides, or a film as described in FIG. 5, having organized striations embossed on its inner surface.

Figure 1B:
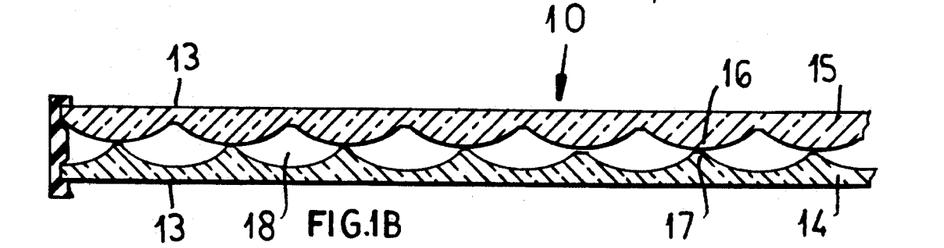
Figure 1C:
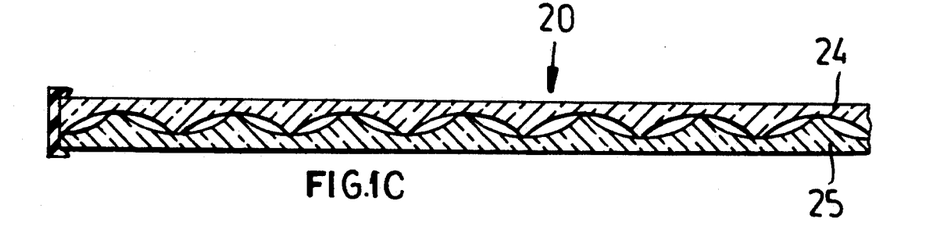

When it is desired to minimize the number of films in a laminate to just two films, in order to reduce cost and weight, individual films are placed with their smooth surfaces pointing outward. Examples of cross sections through such laminates are shown in FIGS. 1B and 1C. FIG. 1B uses one film 14, with concave embossments as the bottom film, and a second film 15, with convex embossments. The embossed surfaces are arranged to face each other so that the diffuser's external surfaces are flat and smooth, and the apexes of the convex embossment 16 rest on the apexes 17 of the concave embossment, creating a void 18 of complex geometry between the two films.

FIG. 1C shows a laminate 20 consisting of two identical films 24 and 25 having convex embossments facing each other. This results in a much thinner film with somewhat less diffusing power than the one shown in FIG. 1B. It should be understood that the configuration described in FIG. 1C should be used only very carefully with a tessellation of faceted polygons having planar surfaces, and particular attention should be paid to assure that faces of opposing polygons do not fully mate with each other leaving n gap between the two films. The extent of light source diffusion can be increased by spacing the films as shown, for instance, in FIGS. 1D and 1E.

Figure 1D:
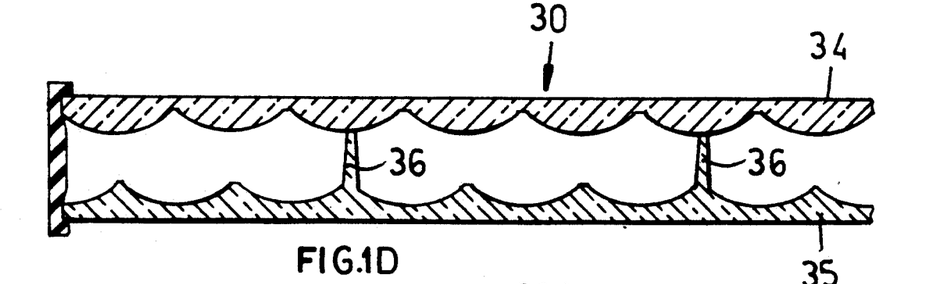
Figure 1E:
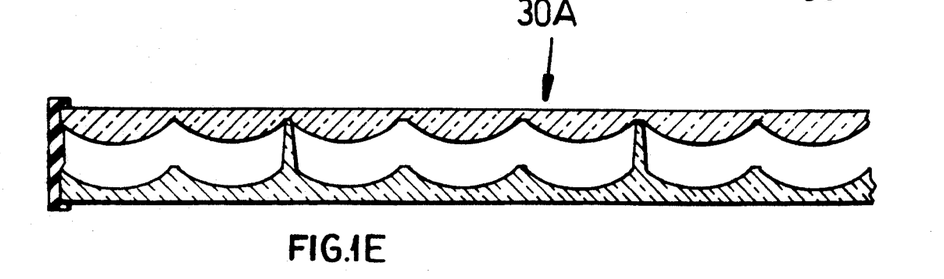

FIG. 1D shows a laminate 30 similar to that described in FIG. 1B, except that the films 34 and 35 are separated by protrusions 36 on one of the film's embossment apexes (in this case the bottom film 35). FIG. 1E has a similar embodiment, except that the two film tessellations are positioned in phase with each other.

Figure 4B:
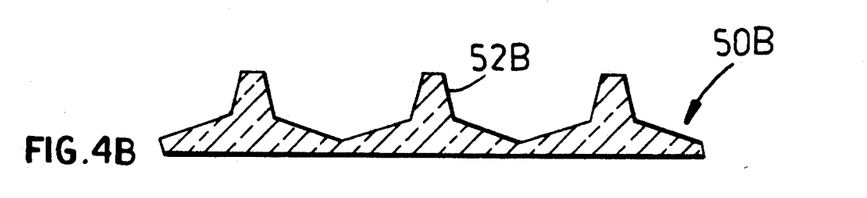
Figure 4C:
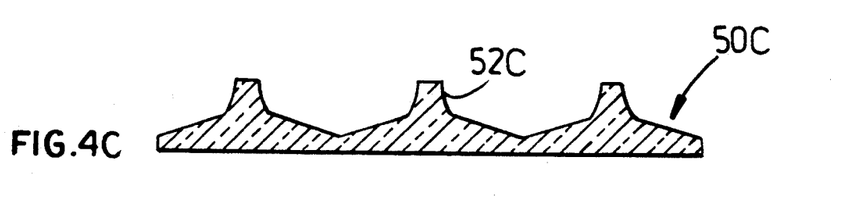
Figure 4D:
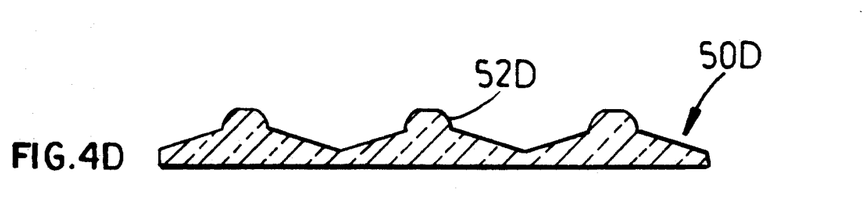
Figure 4E:
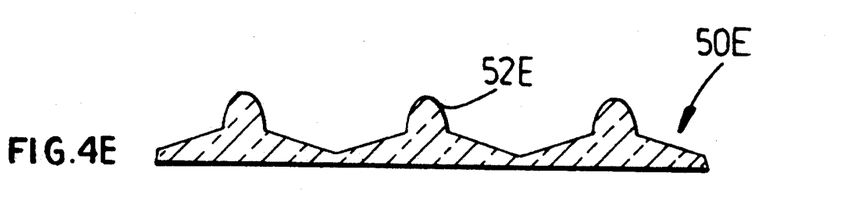

FIGS. 7A through 7D show cross sections through diffuser panels 70A to 70D, respectively, of the instant invention, characterized by having as the top element a film on which is embossed an hexagonal tessellation as described in FIG. 3 and having a cross section as described in FIG. 4A, with bottom films as described in FIGS. 4B to 4C, respectively.

Figure 8A:
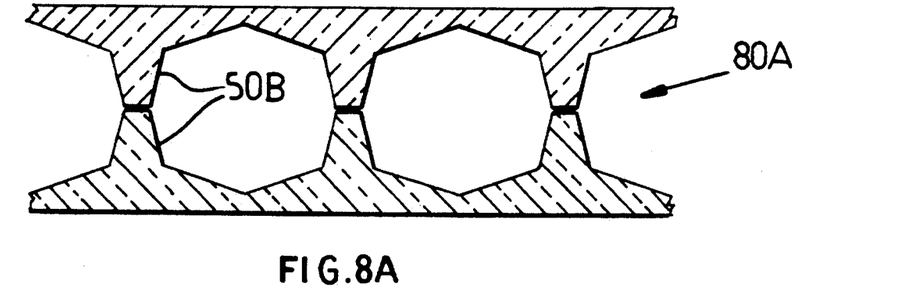
Figure 8B:
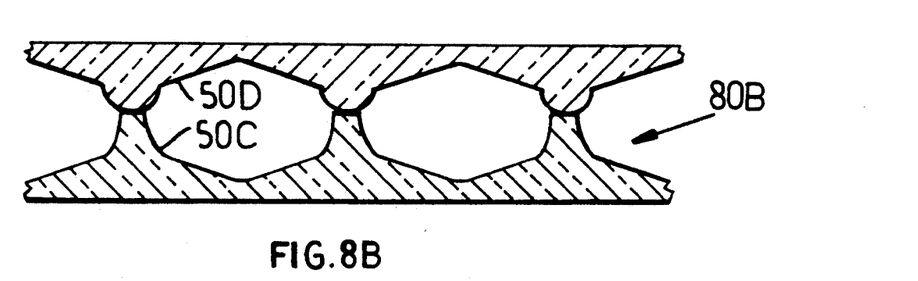
Figure 8C:
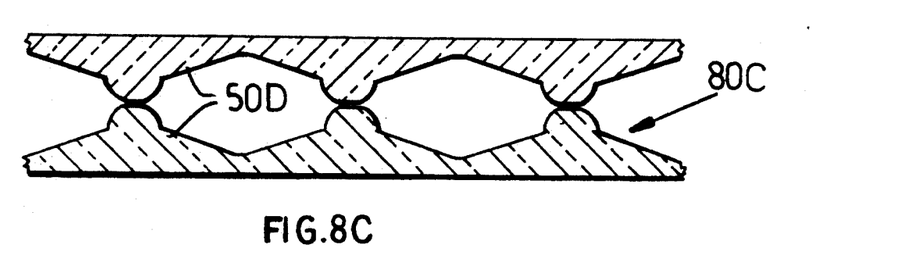
Figure 8D:
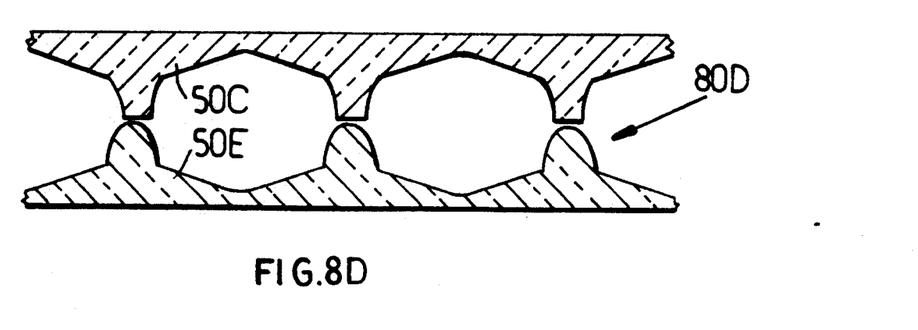

Similarly, in FIGS. 8A and 8C, we show cross sections of diffusers composed of two films of the same geometry (50B and 50D of FIGS. 4B and 4D, respectively) facing each other in phase and having their respective film protrusions opposing each other, while FIGS. 8B and 8D show examples of laminates 80B and 80D respectively, composed of two films of differing geometry (but the same periodicity).

At least one of the films in the laminate can be a faceted film as in FIG. 2 or 3, or in which at least one of the films is a striated film as in FIG. 5 (and FIGS. 6A to 6E). Therefore, diffusers of the instant invention that ar composed of both faceted and striated films are embodiments of the instant invention. While it is preferred to use films in which the embossed patterns have the same periodicity, so as to assure alignment of the separating protrusions with opposing structures in the opposing film, this is not always required. For instance, in laminates as described in FIG. 1A, where the flat surface of the top film faces the embossed surface of the bottom film, the embossments in the two films can have different periodicity.

It should also be understood that the separation of films within a laminate need not be provided exclusively by protrusions that are an integral part of the embossed films. This is particularly true when striated films are used exclusively.

Figure 9:
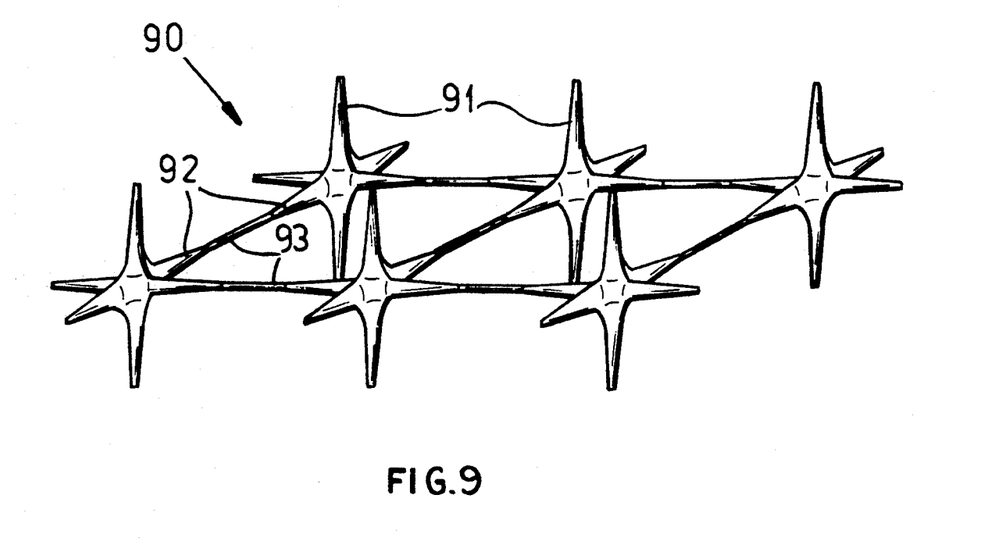
FIGS. 9 and 10 are a perspective view and an elevation of means to obtain interfilm separation in the practice of the instant invention.

In this case, when relatively large separation (relative to the film median thickness) is desired, it can become impractical to provide the interfilm separation as an integral part of one of the films. In this case, as well as with other pairs of films that require interfilm separation without having integral protrusions on the films, special structures can be used as spacers. One such structure, 90, is shown in FIG. 9, where we have a network of vertical spokes 91, interconnected with additional spokes 92 and their extensions 93 in a plane perpendicular to the spokes 91. This plane is also parallel to the two films that need be separated. The links 93 can be made with appropriate indentations so as to facilitate breaking apart segments of the network to size during the assembly of diffusers.

Figure 10:
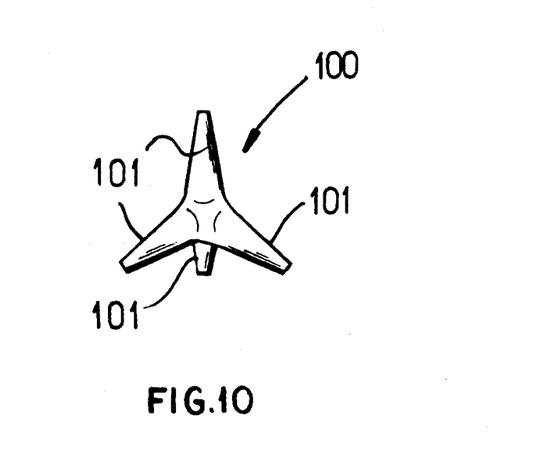

One can also use individual tetraspokal structures 100, as illustrated in FIG. 10, consisting of four spokes, 101, connecting the apexes of an imaginary tetrahedron enclosing the structure 100. The advantage of the tetraspokal structure is in that its cost of manufacture is much lower (the mold for the separating structure 90 is quite complex) and the same tetraspokal elements can be used for a variety of film pairs with relative independence of the specific period of the film's tessellation. The period of the multispokal structure 90 must, however, in most cases, be a simple multiple of the period of the separated film tessellations.

The separating structures illustrated in FIGS. 9 and 10 are best molded from the same material as the film to facilitate consolidation of the films and separators into easily handled laminates for further processing into diffuser screens.

There is a large degree of latitude in choosing the dimensions of the various elements of the diffusers of the instant invention. For instance, the thickness of the films is chosen to minimize the weight and cost of the structure, and as mentioned before, quite acceptable results are obtained with films in the range of 10 to 40 mils. The distance between two adjacent films is determined by the extent of diffusion desired, since the effectiveness of multiple films increases with the spacing between the films. Too large a distance would make the diffusers impractical, however. A good figure of merit is to make the separation about the same size as the periodicity of the embossment on the film. This periodicity (or the distance between repeating pattern in the film tessellations) is itself a function of application, but for diffusers that are viewed from a distance of few feet, an average dimension for the basic tessellation forming polygon in the range of 2 to 10 mm is found to be appropriate.

Figure 11:
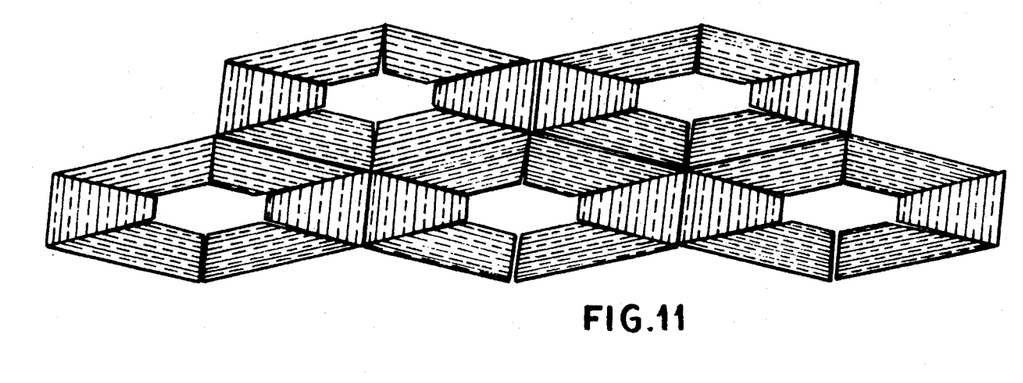
FIGS. 11 and 12 are diagrams which show additional embodiments of films used in the instant invention.
Figure 12:
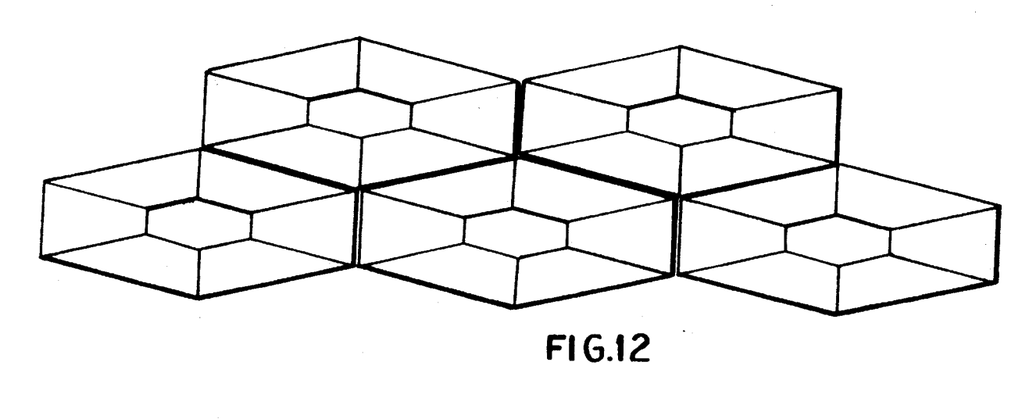

When the diffusers are intended to be used in conjunction with linear lights, like typical fluorescent bulbs, one can choose to have a tessellation with an asymmetric period, namely the repeating polygon is elongated in a direction parallel to the linear light source. An example of the top projection of striated films that can be used in such diffusers is given in FIG. 11, and FIG. 12 shows a similar example of the top projection of a faceted film that can be used in conjunction with linear light sources.

In yet another embodiment of the instant invention to be used in conjunction with linear light sources, at least, the first film (facing the light source) has embossed on its surface equidistant linear striations parallel to the long axis of the light source.

When the distance between the light bulbs in a luminaire is known a priori, the linear striations can be of varying cross section to optimize light distribution from the light bulbs.

Figure 13:
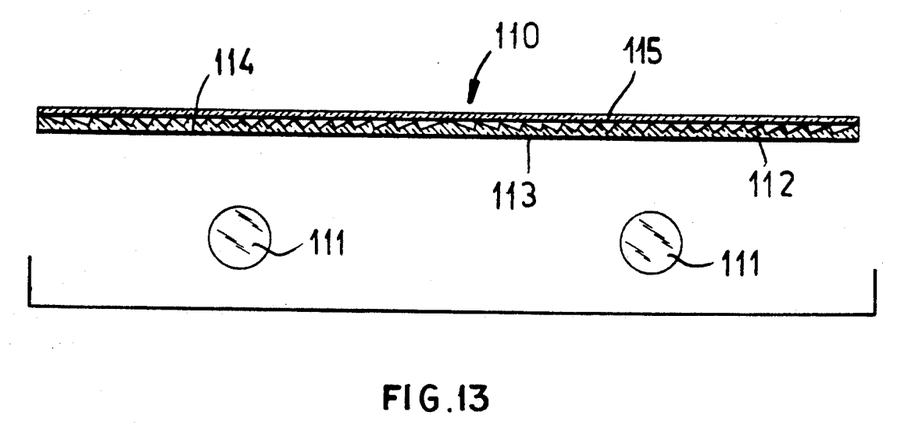
FIGS. 13 and 14 are cross sections through embodiments of the instant inventions suited for use with linear light sources.

One example of such linear diffuser is shown in FIG. 13 which is a cross section of the diffuser 110, perpendicular to the long axis of the linear light sources 111. The bottom film 112 has a smooth surface 113 facing the light sources and a striated surface 114 facing the second film 115. In the zone opposing the light bulb, the striations cross section consists of equilateral triangles, while at locations further away from the light source, the cross section becomes slanted in the direction away from the light source. The pattern is symmetrical relative to the line in the diffuser which is closest to the light source and the pattern is centered around this line and repeats itself above each linear light source in the luminaire.

Figure 14:
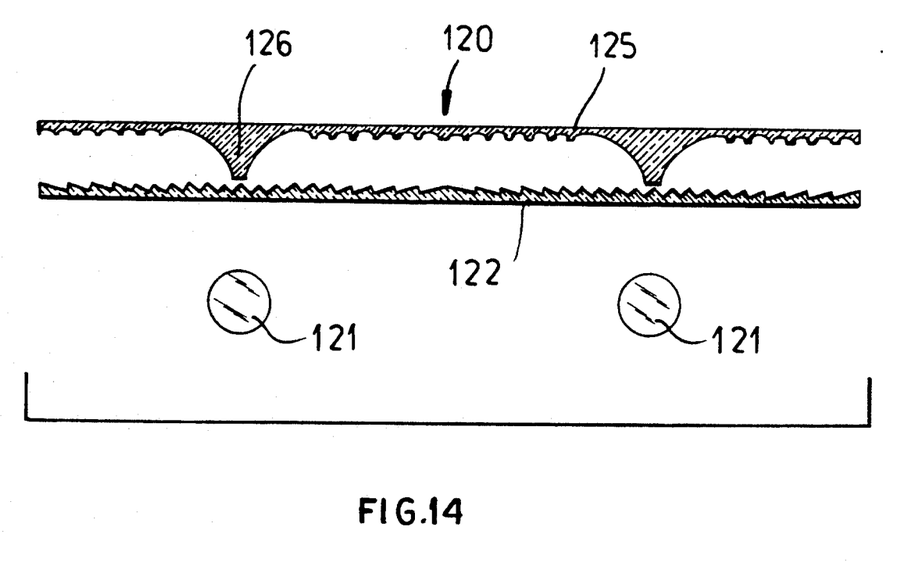

FIG. 13 shows the second film 115, to be featureless on both of its sides and its serves mostly to provide external smooth surfaces. One can choose to have the internal surface of this second film frosted or have an embossed tessellation as described above. An example of a cross section through such a composite diffuser for linear light sources is shown in FIG. 14, where the laminated diffuser 120 consists of a linearly striated film 122, essentially as shown in FIG. 13 separated by protrusions 126 that are integral to the second film 125. The second film is in this case the hexagonally striated film shown in FIG. 6D.

Tessellations involving a repeating pattern of more than one polygon are part of the instant invention. For instance, one could choose a tessellation consisting of octagons (faceted or striated) and squares nested at the junction of four octagons.

Another tessellation could consist of hexagonally grouped cones, or cones grouped in rows and columns. One could similarly choose to use a tessellation of concentric circles organized in a hexagonal pattern or in rows and columns.

It should also be self evident that different tessellations can be used for different films in a single laminate. To facilitate assembly, it is best in this case to have the two tessellations with the same period. It should also be self evident that one could use films in the practice of this invention where the facets of the embossed polyhedra are themselves striated in such a manner as to further optimize diffusion of light from the assembled laminate.

In some applications of the instant invention it may desired to cause the films in a laminate to be permanently fastened to each other. This can be achieved by a number of well known methods in the prior art, including causing such adhesion by thermal treatment of the film (while under minimal compression) by ultrasonic welding of the zones of contact between the films, or even by the use of an appropriate transparent adhesive placed at the extremities of the separating protrusions, when such are used.

In one special embodiment of the instant invention, the diffuser screen is designed to be both flexible and inflatable to its final form. Such diffuser screens are particularly useful for portable lighting systems that need to be deployed as large diffuser screens but must be transported in as small a volume as possible. For this unique embodiment, it is preferred to use polyethylene or other flexible screens on which either a faceted tessellation or a striated tessellation has been embossed.

Unlike most of the other diffusers described, however, during shipment it is not desired to have interfilm separation, thus only films devoid of separating protrusion are used. In all other aspects, this flexible and inflatable screen is as described, for instance in FIG. 1A, except that the evacuating port used there to evacuate the space between adjacent films is now used to inflate this space with air or another appropriate gas at a pressure just sufficient to cause separation of the films within the assembly. When one desires to deploy the screen, it is simply inflated to its final form from an external gas source and the port sealed with a removable plug, in a manner analogous to inflatable mattresses. When the screen needs to be repacked for further shipment or storage, the plug is removed from the inflating port and the screen is deflated and rolled for storage.

While throughout the specification, the terms embossed and embossments have been used to describe the geometrical structures on the surfaces of the laminates' film, it should be understood that similar geometries can be achieved by other methods, for instance, by casting the films onto a mold of the desired shape.

It should also be understood that while most of the embodiments of the instant invention which haves been described use the point to point variation of impinging the light's optical path is provided by a tessellation of faceted or striated polygons, or by linear striations, one could obtain similar point to point variations by assembling the films from a tessellation of small segments of materials in which the index of refraction varies. One such method is the use of materials in which the index of refraction is graded and changes from point to point.

One way to create the films of the instant invention could thus involve the use of an appropriate native transparent film whose index of refraction can be modified by either ion implantation or by diffusion of a foreign species into the native film. An easy manufacturing method would involve depositing on such a native film through an appropriate blocking screen a network of spaced apart dots or patches of a second compound that is capable of modifying the index of refraction of the native film.

After the deposition of the second compound, the film would undergo heat treatment that causes diffusion of the modifying species from the deposition site. When the heat treatment period given is short enough, the concentration of the diffusing species will assume a radial gradient with maximum concentration of the modifying species at the sites of the original deposition and a concentration decreasing radially from these sites. This would result in a diffusing screen equivalent to a tessellation of conical structures. It should be clear that striated structures, as described in this specification, can be achieved in a similar manner by depositing the index of refraction modifying species in a tessellation of concentric polygons or circles as described above.

When using films in which the optical path has bee modified by creating index of refraction gradients, it is best to separate the films with structures as described in FIGS. 9 or 10, since protrusions integral to graded index of refraction films are less practical.

While the principles of this invention have been described with particularity, it should be understood that various modifications and alterations can be made without departing from the spirit of the invention, the scope of which is defined by the appended claims.

I claim:

1. A light system comprising:
   a light source adapted to illuminate an area; and
   at least two refracting substantially transparent and coextensive films juxtaposed with one another and interposed between said source and said area, said films having mutually confronting patterns of refracting rises formed on respective surfaces of said films, said rises being separated by intervening recesses and the rises and recesses being so oriented as to form diversely distributed light-refraction paths across said films, said patterns being selected so that gaps are provided between said films and to effect diffusion of light from said source cast upon said area, said patterns being tessellations of substantially planar polygons having groups of concentric striations parallel to sides of the polygons and said striations are of substantially trapezoidal, triangular or curved cross section.

2. The light system defined in claim 1 wherein said source is elongated and said rises of at least one film are in the form of longitudinal striations.

3. A light system comprising:
   a light source adapted to illuminate an area; and
   at least two refracting substantially transparent and coextensive films juxtaposed with one another and interposed between said source and said area, said films having mutually confronting patterns of refracting rises formed on respective surfaces of said films, said rises being separated by intervening recesses and the rises and recesses being so oriented as to form diversely distributed light-refraction paths across said films, said patterns being selected so that gaps are provided between said films and to effect diffusion of light from said source cast upon said area, said patterns being tessellations of polyhedra with planar or curved facets or tessellations of substantially planar polygons having groups of concentric striations parallel to sides of the polygons, said films being peripherally interconnected to form a diffusion screen.

4. The light system defined in claim 3 wherein said patterns are embossed in only one surface of each of said films and said films have smooth planar surfaces turned away from one another.

5. The light system defined in claim 3 wherein said films have gas-filled spaces between them.

6. The light system defined in claim 5 wherein said films are flexible, said screen being expandable by gas pressurization of said gas-filled spaces.

7. The light system defined in claim 3 wherein said films have evacuated spaces between them.

8. The light system defined in claim 3 wherein said rises of said films bear upon one another to hold said films in position in said screen.

9. The light system defined in claim 3 wherein at least one of said films is formed with projections independent of the respective rises, projecting beyond the respective rises and engaging the other of said films to hold said films in position in said screen.

10. The light system defined in claim 3 wherein said patterns on said surfaces are identical but laterally offset from one another.

11. The light system defined in claim 3 wherein said patterns on said surfaces are complementary but laterally offset from one another.

12. The light system defined in claim 3 wherein rises of one of said films fit into recesses of the other of said films.

13. The light system defined in claim 3 wherein said patterns are tessellations of four-sided or six-sided regular polyhedra with planar or curved facets.

14. The light system defined in claim 13 wherein said polyhedra have projections formed on apexes of said polyhedra.

15. The light system defined in claim 3, further comprising a planar array of spacers interposed between said surface of said films and holding them apart.

16. The light system defined in claim 3 wherein said rises are convexly curved.

17. The light system defined in claim 3 wherein said rises are concavely curved.

18. The light system defined in claim 3 wherein said patterns have the same or different polygons or polyhedra or, in each pattern, the same or different polygons or polyhedra which can include circular arcs.

19. The light system defined in claim 3 wherein one of said patterns is a tessellation of faceted polyhedra while the other of said patterns is a tessellation of striated polygons, both of said tessellations having the same period.

20. The light system defined in claim 3 wherein both of said patterns have the same periodicity.

21. A light system comprising:
    a light source adapted to illuminate an area; and
    at least two refracting substantially transparent and coextensive films juxtaposed with one another and interposed between said source and said area, said films having mutually confronting patterns of refracting rises formed on respective surfaces of said films, said rises being separated by intervening recesses and the rises and recesses being so oriented as to form diversely distributed light-refraction paths across said films, said patterns being selected so that gaps are provided between said films and to effect diffusion of light from said source cast upon said area, said patterns being tessellations of polyhedra with planar or curved facets or tessellations of substantially planar polygons said source being elongated, and said polyhedra or said polygons being elongated in a direction parallel to a direction of elongation of said source.

22. The light system defined in claim 21 wherein said source is a row of lights, and said polyhedra or said polygons being elongated in a direction parallel to said row.

* * * * *